United States Patent [19]

Otteson

[11] Patent Number: 4,798,258
[45] Date of Patent: Jan. 17, 1989

[54] THROTTLE CONTROL ASSEMBLY FOR A VEHICLE SPEED CONTROL UNIT
[75] Inventor: Jack O. Otteson, Laurinburg, N.C.
[73] Assignee: Dana Corporation, Toledo, Ohio
[21] Appl. No.: 947,724
[22] Filed: Dec. 30, 1986

Related U.S. Application Data

[60] Division of Ser. No. 712,542, Mar. 15, 1985, Pat. No. 4,637,485, which is a continuation-in-part of Ser. No. 603,494, Apr. 24, 1984, abandoned.

[51] Int. Cl.⁴ .............................................. B60K 31/06
[52] U.S. Cl. ..................... 180/175; 123/360; 123/401; 180/170; 417/413
[58] Field of Search ............... 180/174, 175, 176, 177, 180/170; 417/413, 534; 123/360, 378, 401

[56] References Cited

U.S. PATENT DOCUMENTS

| Re. 27,324 | 3/1972 | Granger et al. | 180/176 |
| 3,273,584 | 9/1966 | Kennepohl | 417/413 |
| 4,137,020 | 1/1979 | Ito et al. | 417/534 |
| 4,453,517 | 6/1984 | Kasiewicz | 180/176 |

FOREIGN PATENT DOCUMENTS

| 2256218 | 5/1974 | Fed. Rep. of Germany | 417/413 |
| 2646340 | 4/1978 | Fed. Rep. of Germany | 417/413 |
| 128484 | 8/1983 | Japan | 417/413 |
| 45433 | 3/1985 | Japan | 180/177 |

Primary Examiner—John J. Love
Assistant Examiner—Eric Culbreth
Attorney, Agent, or Firm—MacMillan, Sobanski & Todd

[57] ABSTRACT

An ajustable throttle connector for a vehicle speed control unit is disclosed. The adjustable throttle connector includes a throttle connector arm which is pivotally connected in an adjustable manner to a housing for the vehicle speed control unit. The adjustable pivotal connection is accomplished by forming a plurality of apertures in the throttle connector arm near the center thereof. A corresponding plurality of apertures are formed in the housing. A pin is inserted through a selected one of the apertures formed in the throttle connector arm and also through the corresponding one of the apertures formed in the housing to provide a fulcrum about which the throttle connector arm is free to pivot. The throttle connector arm is connected between a throttle servo diaphragm and a linkage to the vehicle throttle such that the ratio of the length of movement of the throttle servo diaphragm with respect to the corresponding length of movement of the throttle linkage can be varied by changing the placement of the pin in the apertures. The present invention also includes a motor-driven vacuum pump for actuating the throttle servo.

14 Claims, 7 Drawing Sheets

THROTTLE CONTROL ASSEMBLY FOR A VEHICLE SPEED CONTROL UNIT

CROSS REFERENCE TO RELATED APPLICATIONS

This is a division of application Ser. No. 712,542, filed Mar. 15, 1985, now U.S. Pat. No. 4,637,485, issued Jan. 20, 1987, which was a continuation-in-part of application Ser. No. 603,494, filed Apr. 24, 1984, now abandoned.

BACKGROUND OF THE INVENTION

The present invention relates in general to vehicle speed control units and in particular to an adjustable throttle connector for such a vehicle speed control unit.

Vehicle speed control units are widely known in the art and are adapted to maintain a vehicle at a constant predetermined speed despite varying engine loads, such as are imposed by the course of the road or the wind. Because of their reliability, accuracy, and inexpensiveness, fluid-actuated vehicle speed control units have become the dominant factor in the marketplace. Such speed control units typically utilize vacuum from the vehicle engine manifold as the actuating force. The vacuum is selectively supplied to a diaphragm connected to the engine throttle linkage, thereby increasing or decreasing the throttle position to increase or decrease engine power to maintain the vehicle speed. The control unit for such a system compares a signal representing the actual vehicle speed with a signal representing the desired vehicle speed and adjusts the vacuum level supplied to the diaphragm accordingly.

One problem encountered in utilizing vehicle speed control units of this type is that the total length of throttle travel from a fully closed position to a fully open position varies greatly from vehicle to vehicle, depending upon engine design. Thus, the size and stroke length of the vacuum diaphragm of the speed control unit must also vary from vehicle to vehicle in order to provide an efficient and responsive operation. For example, if a relatively short stroke vacuum diaphragm is utilized, the vehicle speed control unit will not be able to fully open the throttle of a long stroke linkage vehicle. On the other hand, if a relatively long stroke vacuum diaphragm is utilized, the vehicle speed control unit will make overly large throttle corrections when utilized on a short stroke linkage vehicle and may possibly damage the throttle linkage by attempting to open the throttle beyond its maximum position. Unfortunately, it is very costly and inefficient to provide a plurality of different vehicle speed control unit models, each adapted for use in a particular type of vehicle model or engine.

SUMMARY OF THE INVENTION

The present invention relates to an adjustable throttle connector for a vehicle speed control unit which matches the stroke of a throttle servo of the speed control unit to the stroke of the vehicle throttle linkage. The adjustable throttle connector includes a throttle connector arm which is pivotally connected as a lever in an adjustable manner to a housing for the vehicle speed control unit. The adjustable pivotal connection is accomplished by forming a plurality of apertures in the throttle connector arm near the center thereof. A corresponding plurality of apertures are formed in the housing. A pin is inserted through a selected one of the apertures formed in the throttle connector arm and also through the corresponding one of the apertures formed in the housing to provide a fulcrum about which the throttle connector arm is free to pivot. The throttle connector arm is connected between a throttle servo and a linkage to the vehicle throttle such that the ratio of the length of movement of the throttle servo with respect to the corresponding length of movement of the throttle linkage can be varied by changing the placement of the pin in the apertures. The present invention also includes a motor-driven vacuum pump for actuating the throttle servo. Since the vacuum pump is included in the vehicle speed control unit, the unit is not dependent upon external sources and conduit for vacuum to actuate the throttle servo.

It is an object of the present invention to provide a vehicle speed control unit which is adaptable for use on a plurality of different vehicle models and engines.

It is another object of the present invention to provide such a vehicle speed control unit which is reliable and accurate on differing vehicle models or engines.

It is a further object of the present invention to provide such a vehicle speed control unit which is easy to install and adjust on differing vehicle models and engines.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
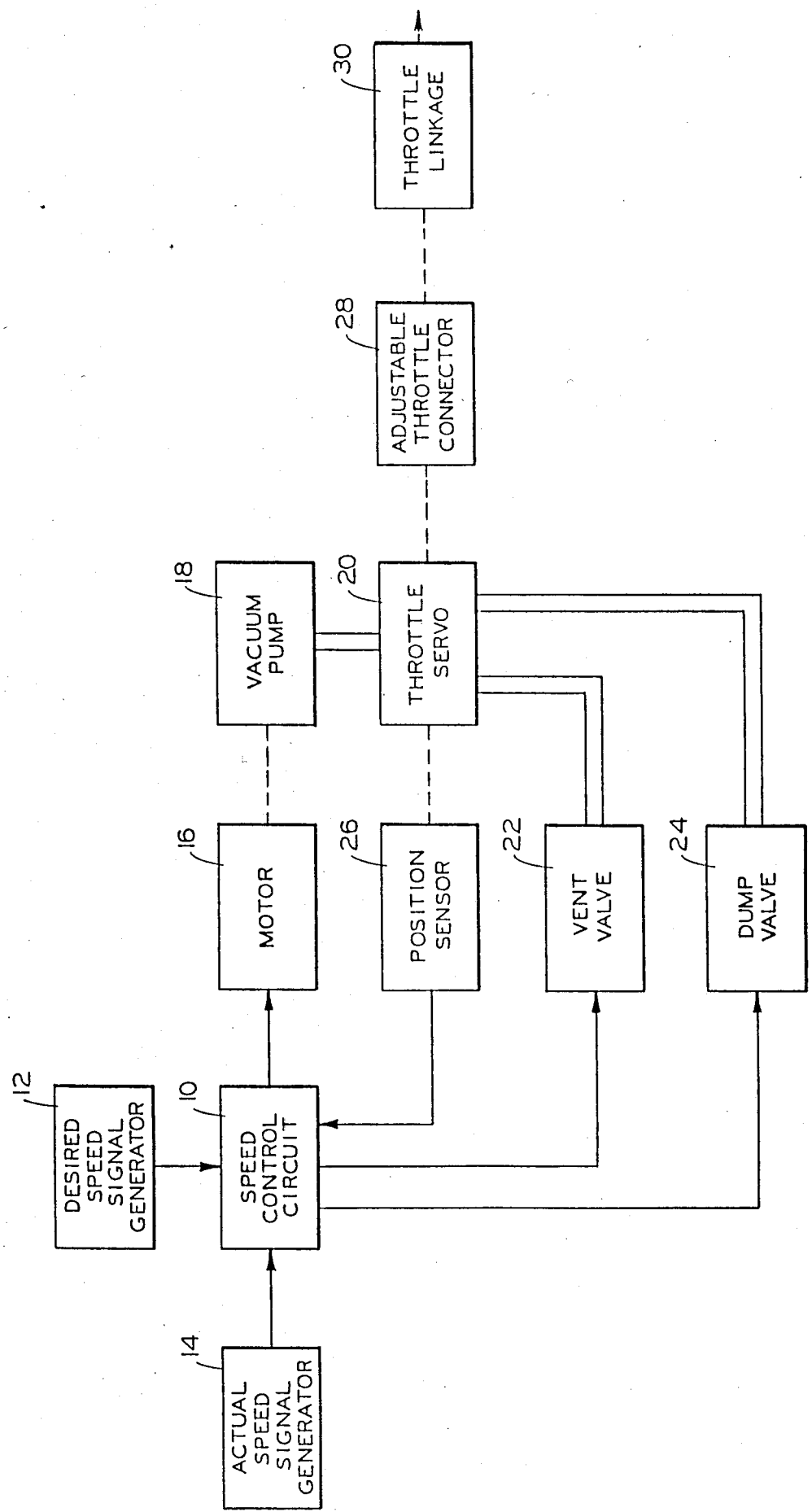
FIG. 1 is a block diagram of a vehicle speed control unit in accordance with the present invention.

Referring now to the drawings, there is illustrated in FIG. 1 a block diagram of a vehicle speed control unit in accordance with the present invention. An electronic speed control circuit 10 is adapted to receive electrical signals from a desired speed signal generator 12 and an actual speed signal generator 14. Typically, the desired speed signal generator 12 includes a potentiometer (not shown) or any other means manually operable by the vehicle operator in order to generate an electrical signal representative of the speed at which the operator desires the vehicle to be maintained. The actual speed signal generator 14 can consist of any means for generating an electrical signal representative of the actual speed of the vehicle.

The speed control circuit 10 compares the signals from the desired speed signal generator 12 and the actual speed signal generator 14 in a known manner and generates electrical signals to control the operation of a motor 16. The motor 16 is mechanically connected to a vacuum pump 18 such that operation of the motor 16 causes the vacuum pump 18 to supply vacuum to one side of a throttle servo 20. The other side of the throttle servo 20 communicates with the atmosphere. The throttle servo 20 is conventional in the art and includes an enclosed diaphragm 20a FIGS. 2 and 3 which is linearly moveable therein. When vacuum is supplied to the throttle servo 20 by the vacuum pump 18, the diaphragm 20a is moved in one direction (a speed increasing direction) against the urging of a spring (not shown) or other resilient means for urging the diaphragm 20a in the opposite direction (a speed decreasing direction). The vacuum side of the throttle servo 20 is also connected to a vent valve 22 and a dump valve 24. The vent valve 22 is adapted to provide selective communication between the one side of the throttle servo 20 and the atmosphere at a predetermined relatively slow rate. The dump valve 24 is adapted to provide selective communication between the one side of the throttle servo 20 and the atmosphere at a predetermined relatively fast rate. When either of the valves 22 and 24 is opened to provide such communication, the diaphragm 20a of the throttle servo 20 will move in the speed decreasing direction under the influence of the resilient member. The vent valve 22 and the dump valve 24 are controlled by electrical signals generated by the speed control unit 10.

A position sensor 26 is mechanically connected to the throttle servo 20 and provides an electrical signal to the speed control circuit 10 indicative of the actual position of the diaphragm 20a within the throttle servo 20, as controlled by the above-described operation of the vacuum pump 18, the vent valve 22, and the dump valve 24. The throttle servo diaphragm 20a is also mechanically connected through an adjustable throttle connector 28 to a throttle linkage 30 of the vehicle. The throttle linkage 30 is connected to the throttle (not shown) of the vehicle engine in a known manner to regulate the position of the throttle in accordance with the movement of the throttle servo 20 via the adjustable throttle connector 28.

Figure 2:
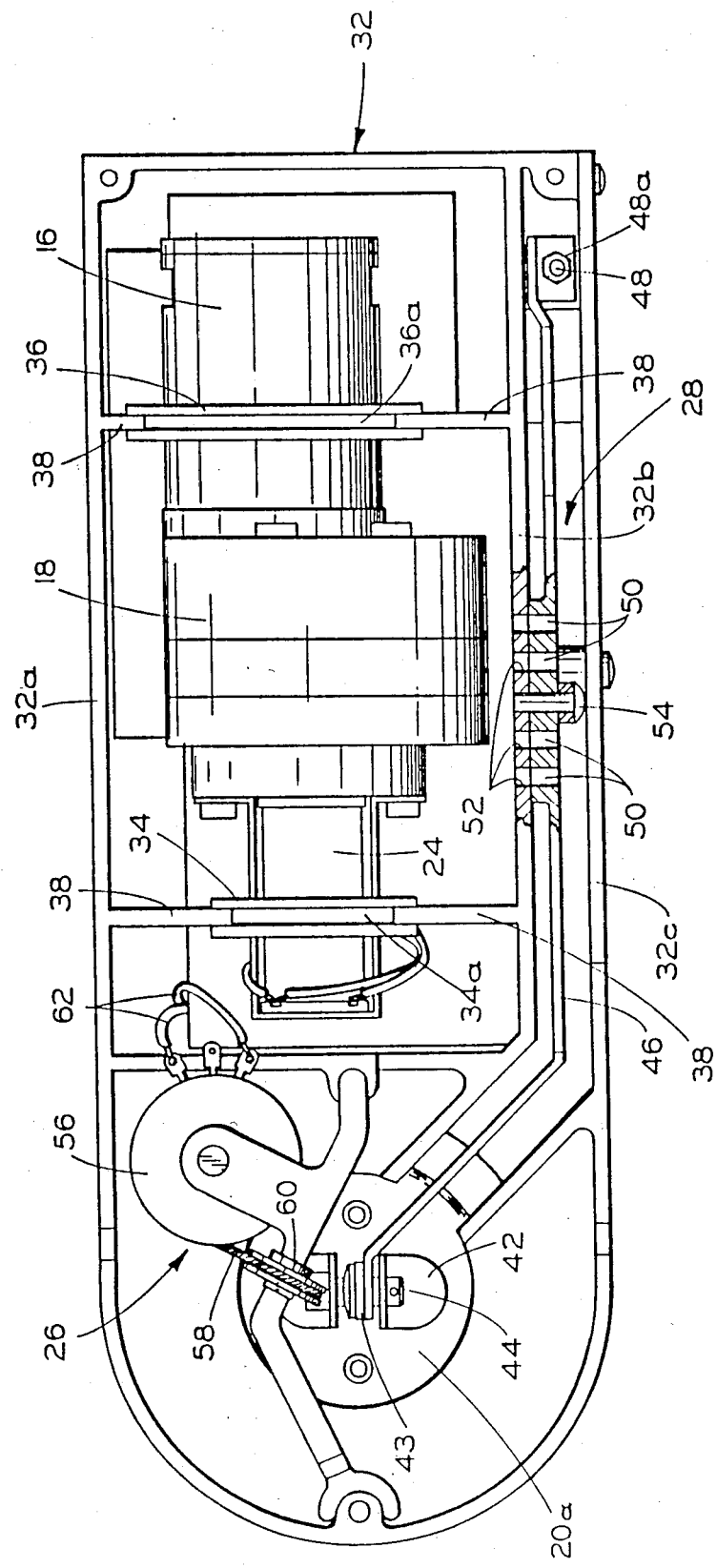
FIG. 2 is a top plan view, partially in section, of the mechanical throttle control components of the vehicle speed control unit of FIG. 1.
Figure 3:
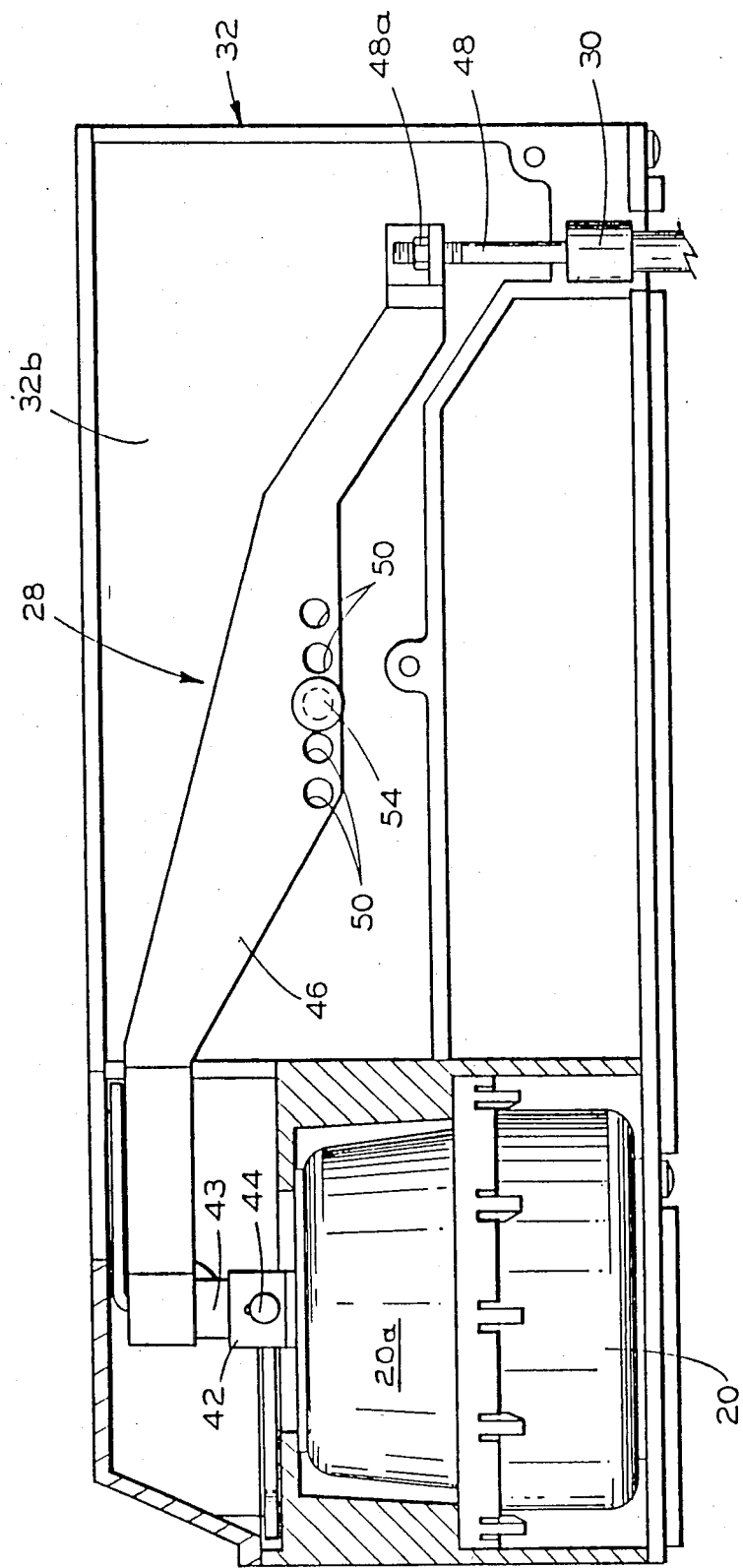
FIG. 3 is a side elevational view, partially in section, of the mechanical throttle control components illustrated in FIG. 2.
Figure 4:
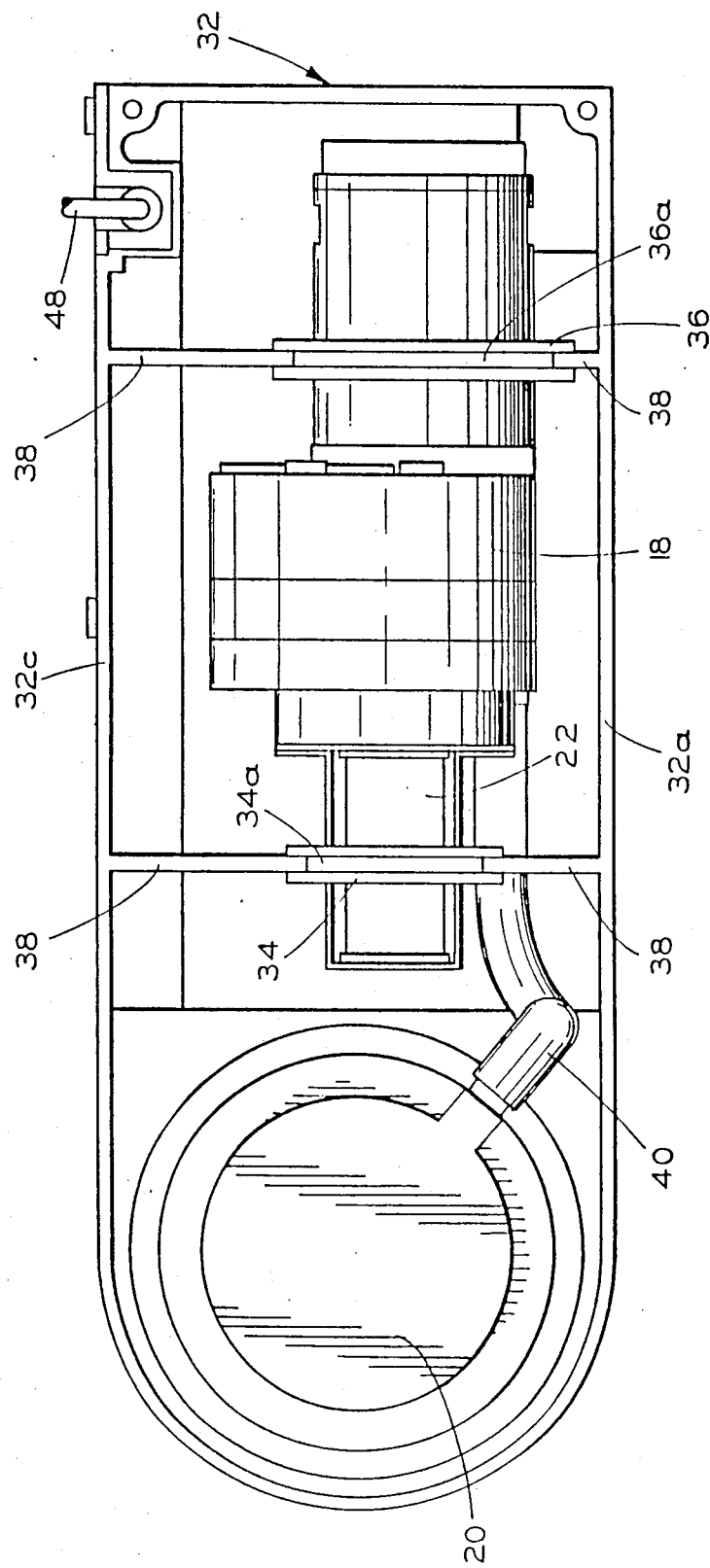
FIG. 4 is a bottom plan view of the mechanical throttle control components of FIG. 2.

Referring now to FIGS. 2, 3, and 4, the construction and operation of the mechanical throttle control components, namely, the throttle servo 20, the position sensor 26, and the adjustable throttle connector 28, are illustrated in detail. As shown therein, the motor 16 is attached to one end of the vacuum pump 18. The vent valve 22 and the dump valve 24 are attached to the other end of the vacuum pump 18. The motor 16, the vacuum pump 18, and the valves 22 and 24 are all secured within a housing 32 for the mechanical throttle components by a pair of spacer elements 34 and 36. One of the spacer elements 34 is attached to the valves 22 and 24, while the other of the spacer elements 36 is attached to the motor 16. The spacer elements 34 and 36 each include a respective central channel portion 34a and 36a formed about the periphery thereof which cooperate with respective boss members 38 formed on a first exterior wall 32a of the housing 32 and on an interior panel 32b formed therein. The spacer elements 34 and 36 provide a secure support for the above-described motor 16, vacuum pump 18, and valves 22 and 24 within the housing 32.

The structure and operation of the motor 16 and the vacuum pump 18 will be explained and illustrated below in detail. However, as previously mentioned, actuation of the motor 16 by the speed control circuit 10 causes the vacuum pump 18 to generate a vacuum. This vacuum is supplied through a tube or hose 40 (FIG. 4) to one side of the throttle servo 20. The diaphragm 20a mounted within the throttle servo 20 is linearly movable upwardly and downwardly therein. The diaphragm 20a is attached to an upstanding bracket 42 which extends outwardly from the top of the throttle servo 20. The bracket 42 is adapted for linear movement with the diaphragm 20a. A link member 43 is pivotally connected at one end to the bracket 42 by a linkage pin 44. The other end of the link member 43 is secured to one end of a throttle connector arm 46'. The other end of the throttle connector arm 46 is connected to a throttle cable 48 by a nut 48a forming part of the throttle linkage 30.

Between the two ends thereof, the throttle connector arm 46 is pivotally connected in an adjustable manner to the interior panel 32b of the housing 32. Such adjustable pivotal connection is accomplished by forming a plurality of apertures 50 in the throttle connector arm 46 near the center thereof. A corresponding plurality of apertures 52 are formed in the interior panel 32b of the housing 32. Although the present invention is explained and illustrated as including five of each of the apertures 50 and 52, it will be appreciated that any number of such apertures can be utilized. A pin 54 is inserted through a selected one of the apertures 50 formed in the throttle connector arm 46 and also through the corresponding one of the apertures 52 formed in the interior panel 32b of the housing 32 to provide a fulcrum about which the throttle connector arm 46 is free to pivot. The pin 54 can be maintained in the apertures 50 and 52 by a second exterior wall 32c of the housing 32. The second exterior wall 32c is removably attached to the housing 32 such that it can be removed to permit the placement of the pin 54 to be adjusted. After such adjustment is made, the second exterior wall 32c is re-attached to the housing 32, thereby blocking the pin 54 and preventing it from being removed from the apertures 50 and 52. Thus, it will be appreciated that the throttle connector arm 46 provides a first class lever between the throttle servo 20 and the throttle linkage 30.

In operation, when vacuum is supplied to the one side of the throttle servo 20 by the vacuum pump 18, the diaphragm 20a will be moved downwardly within the throttle servo 20 because of the pressure differential generated between the opposing sides thereof. Consequently, the bracket 42, the link member 43, and the one end of the throttle connector arm 46 will also be pulled downwardly when viewed as illustrated in FIG. 3. Because the throttle connector arm 46 is pivotally connected to the interior panel 32b of the housing 32, the other end of the throttle connector arm 46 will be moved in the opposite direction or upwardly when vacuum is applied to the throttle servo 20. A ratio can easily be calculated relating the downward length of travel of the one end of the throttle connector arm 46 to the corresponding upward length of travel of the other end of the throttle connector arm 46 for a given fulcrum point, as determined by the placement of the pin 54. Since the pin 54 can be inserted through any one of the apertures 50 formed in the throttle connector arm 46 and through the corresponding one of the apertures 52 formed in the interior panel 32b of the housing 32, it will be appreciated that each fulcrum point provides a different such ratio. With reference to FIG. 3, it can be seen that the ratio relating the downward length of travel of the one end of the throttle connector arm 46 to the upward length of travel of the other end of the throttle connector arm 46 will increase as the fulcrum point is moved farther away from the throttle servo 20. In other words, when the pin 54 is inserted in the apertures 50 and 52 nearest to the throttle servo 20, a predetermined downward length of travel imparted to the one end of the throttle connector arm 46 connected to the throttle servo diaphragm 20a will cause the other end of the throttle connector arm 46 to travel a relatively large upward length. As the pin 54 is removed and re-inserted in the apertures 50 and 52 which are subsequently further away from the throttle servo 20, the same predetermined downward length of travel imparted to the one end of the throttle connector arm 46 connected to the throttle servo diaphragm 20a will cause the other end of the throttle connector arm 46 to travel successively lesser upward lengths.

Since the diaphragm 20a of the throttle servo 20 has a constant stroke length, it can be seen that the above-described adjustable throttle connector 28 provides a simple and effective means for adjusting the actual stroke length applied to the throttle linkage 30 and, thus, the vehicle engine throttle by the throttle servo 20 diaphragm 20a. In engines having a longer length of throttle travel between the fully closed and opened positions, the pin 54 will be inserted in the apertures 50 and 52 nearer to the throttle servo 20. In engines having a shorter length of throttle travel between the fully closed and opened positions, the pin 54 will be inserted in the apertures 50 and 52 further from the throttle servo 20. It has been found that five such apertures provides a satisfactory range of adjustments for most vehicles. However, it is contemplated within the present invention that only one of each of the apertures 50 and 52 be provided. By utilizing such a structure, a predetermined length of movement of the diaphragm 20a enclosed within the throttle servo 20 will impart a single selected length of movement to the vehicle engine throttle.

As mentioned above, the position sensor 26 is mechanically connected to the throttle servo 20 to generate an electrical signal to the speed control circuit 10 representing the actual position of the diaphragm 20a within the throttle servo 20. In the embodiment illustrated in FIG. 2, it can be seen that the position sensor 26 includes a rotatable potentiometer 56 which is connected by a flexible cable 58 extending over a pulley 60 to the linkage pin 44. The potentiometer 56 is biased by a spring (not shown) such that a predetermined amount of tension is applied to the flexible cable 58 to keep it taut. Movement of the diaphragm 20a and the link member 42 as described above causes the wiper arm (not shown) of the potentiometer 56 to move. Consequently, the resistance of the potentiometer 56 is varied in accordance with the movement of the diaphragm 20a. The potentiometer 56 is connected by a pair of conductors 62 to the speed control circuit 10 such that an electrical signal representative of the position of the diaphragm 20a within the throttle servo 20 is supplied thereto.

Figure 5:
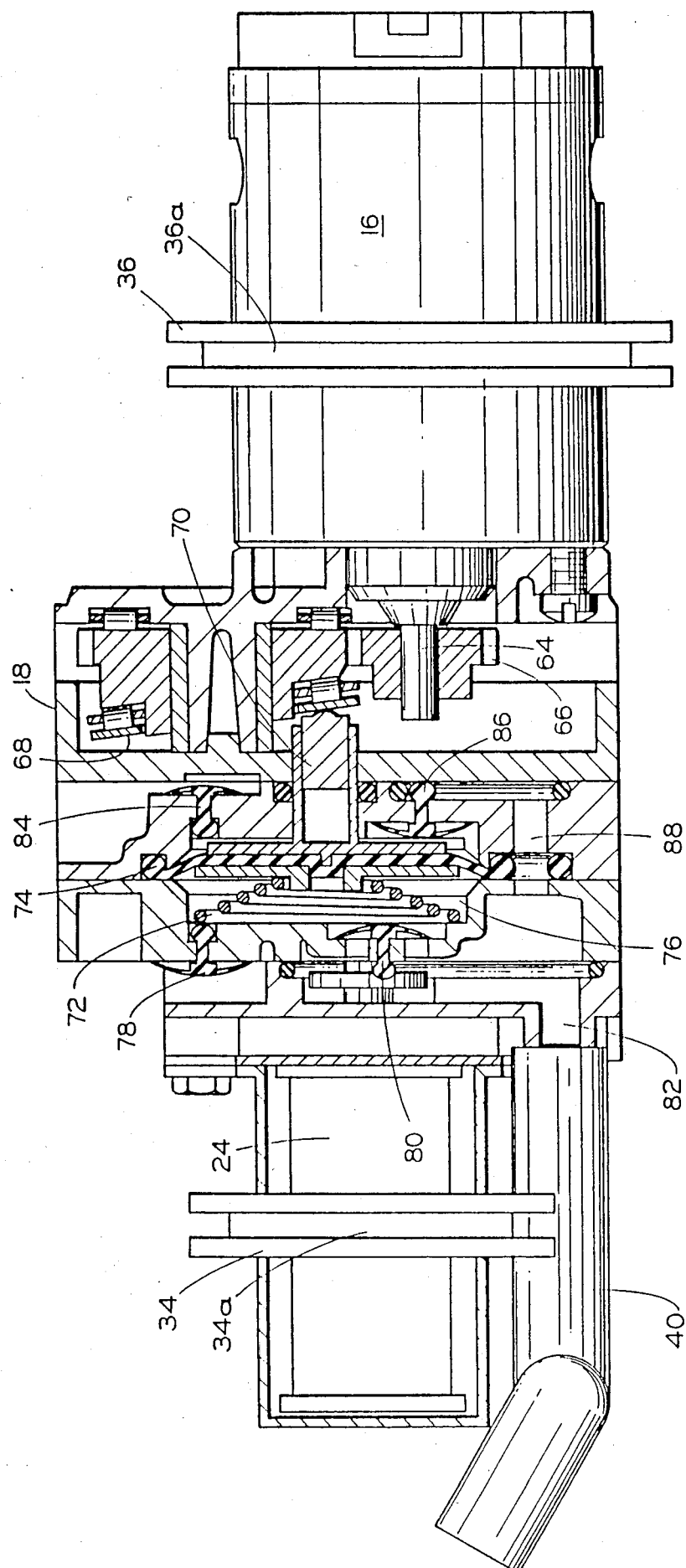
FIG. 5 is a bottom plan view, partially in section, of the motor, vacuum pump, and control valves of the mechanical throttle control components of FIG. 2.

Referring now to FIGS. 2, 4, and 5, the structure and operation of the motor 16, the vacuum pump 18, and the vent and dump valves 22 and 24, respectively, are illustrated in detail. The motor 16 can be any conventional electric motor having a rotatable output shaft 64. The output shaft of the motor is connected through a speed reducing gear train 66 to a swash plate assembly 68 of the vacuum pump 18. The swash plate assembly 68 is engaged by one end of a reciprocating plunger assembly including a plunger rod 70a and a plunger head 70b. A spring 72 is provided on the other side of a flexible diaphragm 74 to bias it against the swash plate assembly 68. The flexible diaphragm 74 is held against the plunger head 70b within a pumping chamber 76 by the bias of the spring 72. When the swash plate 68 is rotated by the motor 16, the plunger assembly and the diaphragm 74 are moved within the vacuum pump 18 in reciprocating fashion. A first pair of one-way valves 78 and 80 are provided on the pumping chamber 76 on one side of the diaphragm 74. The valve 78 provides fluid communication from the pumping chamber 76 to the atmosphere, while the valve 80 provides fluid communication from a vacuum chamber 82 to the pumping chamber 76.

When the plunger assembly and diaphragm 74 are moved from left to right as shown in FIG. 5, the valve 78 will close to prevent air from the atmosphere from entering the pumping chamber 76. Simultaneously, the valve 80 will open to draw air into the pumping chamber 76 from the vacuum chamber 82. Thus, a vacuum will be created in the vacuum chamber 82. When the plunger assembly and the diaphragm 74 are moved from right to left as illustrated in FIG. 5, the valve 78 will open to exhaust the air within the pumping chamber 76 to the atmosphere. Simultaneously, the valve 80 will close to prevent air which has been drawn from the vacuum chamber 82 to re-enter. Similarly, a second pair of one-way valves 84 and 86 are provided in the pumping chamber 76 on the other side of the diaphragm 74. The valve 84 provides fluid communication from the pumping chamber 76 to the atmosphere, while the valve 86 provides fluid communication from a passageway 88 connected to the vacuum chamber 82 to the pumping chamber 76. The valves 84 and 86 operate in a manner similar to that described above such that one side of the vacuum pump 18 is drawing air from the vacuum chamber 82 while the other side of the vacuum pump is exhausting the drawn air to the atmosphere, and vice versa. Furthermore, the vacuum pump 18 operates as a check valve when the motor 16 is turned off, since the valves 80 and 86 will remain closed to maintain the vacuum which has been established in the vacuum chamber 82. The speed reducing gear train permits the utilization of a higher speed, lower torque motor than would by required with a 1:1 or direct drive gear ratio. A higher speed, lower torque motor will typically come in a smaller package. The double acting pump 18 can be packaged more compactly than a single acting pump of the same stroke and displacement. Such an arrangement allows a relatively small vacuum pump 18 package size for the capacity.

As mentioned above, the vacuum chamber 82 is connected through the hose 40 to the one side of the throttle servo 20. The valves 22 and 24 provide selective communication between the vacuum chamber 82 and the atmosphere. Both of the valves 22 and 24 are normally opened, providing such communication, and must be actuated to their closed positions by signals from the speed control circuit 10. The vent valve 22 includes an orifice (not shown) having a small diameter, while the dump valve 24 includes an orifice (not shown) having a large diameter. Thus, the rate at which air can pass through the vent valve 22 is slower than the rate at which air can pass through the dump valve 24. The structure and operation of the valves 22 and 24 is conventional in the art.

In operation, the speed control circuit 10 generates signals to actuate the motor 16 and the valves 22 and 24 when the signal from the desired speed signal generator 12 exceeds the signal from the actual speed signal generator 14. In response thereto, the motor 16 will rotate the swash plate 68, causing the plunger assembly and the diaphragm 74 to reciprocate within the pumping chamber 76 and generate a vacuum in the vacuum chamber 82. Additionally, the valves 22 and 24 will close, preventing communication between the vacuum chamber 82 and the atmosphere. The vacuum generated by the vacuum pump 18 is supplied to the throttle servo 20 through the hose 40. The diaphragm 20a, the adjustable throttle connector 28, and the throttle linkage 30 will all travel as described above to move the engine throttle in a speed increasing direction. This action will continue until the actual speed of the vehicle reaches the desired speed, as determined by the speed control circuit 10. At that time, the motor 16 will be disabled by the speed control circuit 10, ceasing the application of additional vacuum to the throttle servo 20. As mentioned above, the vacuum pump 18 acts as a check valve, maintaining the vacuum which previously has been supplied to the throttle servo 20. Accordingly, the diaphragm 20a will be maintained in position without further operation of the speed control unit.

If the actual speed of the vehicle should fall below the desired speed, the speed control circuit 10 will again actuate the motor 16 to increase the speed of the vehicle as described above. If the actual speed of the vehicle should rise above the desired speed, the speed control circuit 10 will actuate the vent valve 22 to its open position, allowing relatively slow communication between the vacuum chamber 82 and the atmosphere. As the amount of vacuum in the vacuum chamber 82 gradually decreases, the diaphragm 20a and the other mechanical throttle control components will move in a speed decreasing direction until the actual speed of the vehicle returns to the desired speed, at which time the vent valve 22 will be closed by the speed control circuit 10. If the speed control unit is turned off or if rapid disengagement of the unit is desired, such as when the brakes of the vehicle are utilized, the dump valve 24 will be opened by the speed control circuit 10. The vacuum chamber 82 will be quickly vented to the atmosphere, thus disabling the speed control unit.

Figure 6:
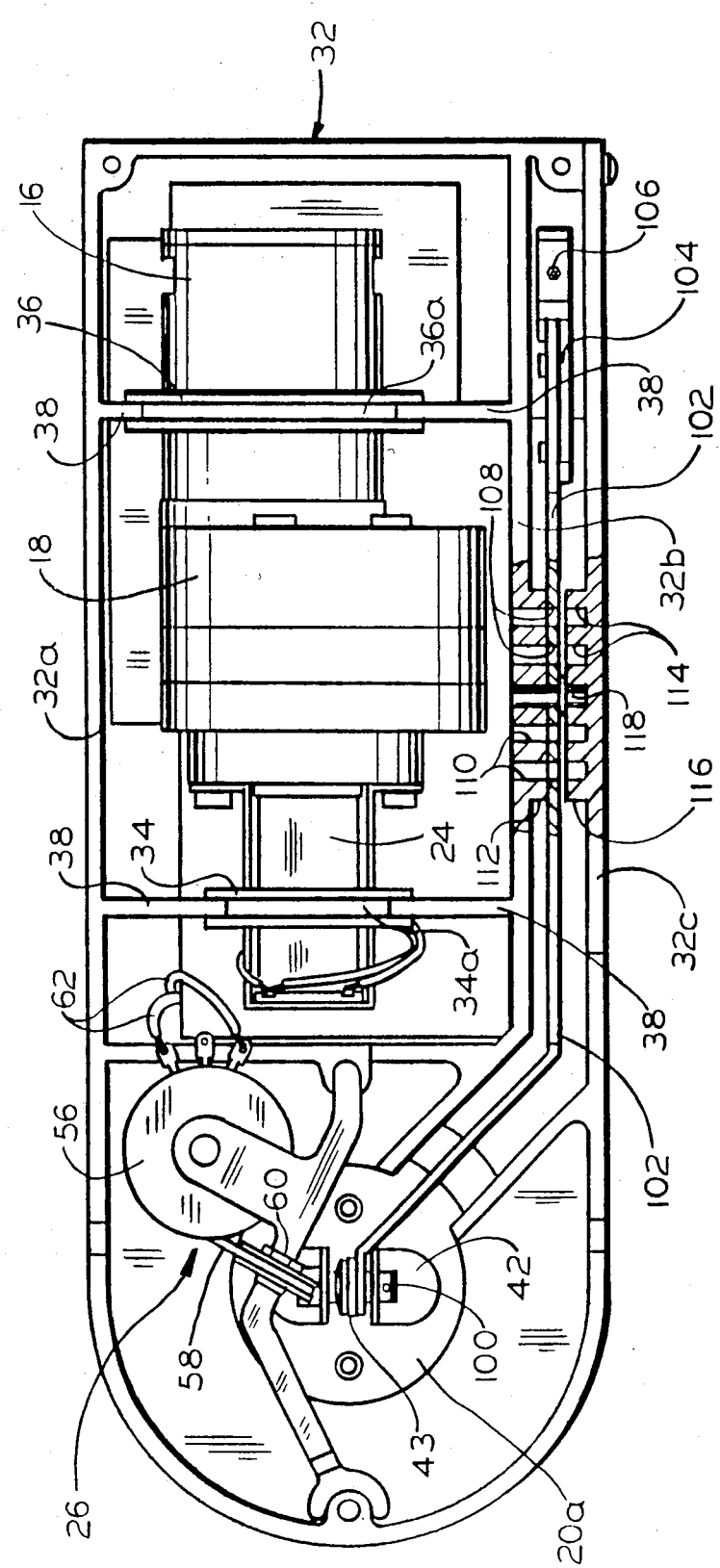
FIG. 6 is a top plan view similar to FIG. 2 illustrating a modified embodiment of the present invention.
Figure 7:
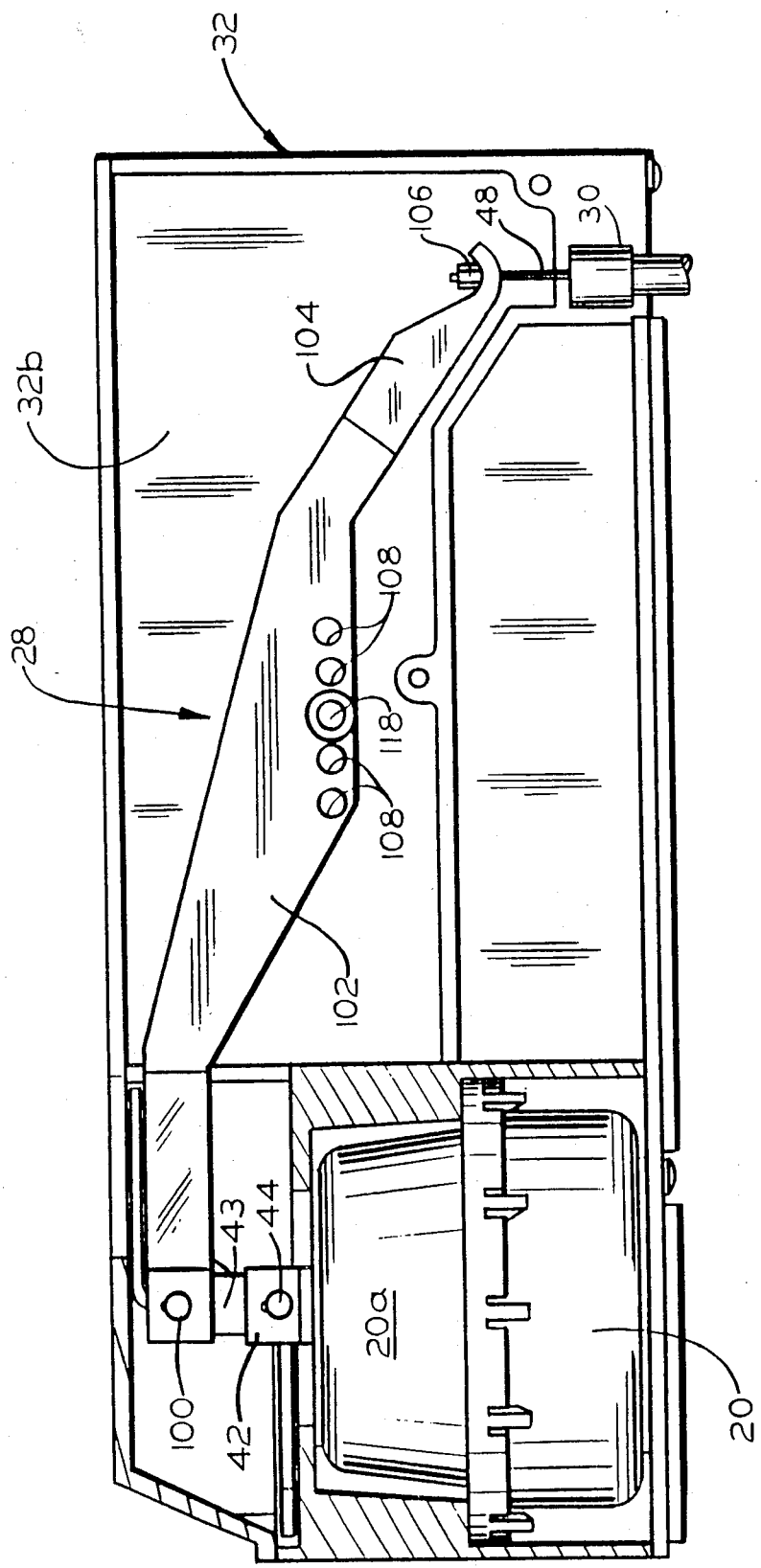
FIG. 7 is a side elevational view of the mechanical throttle control components of FIG. 6.

Referring now to FIGS. 6 and 7, a modified embodiment of the present invention is illustrated. As will become apparent, the modified embodiment is slightly more complicated than the above-described embodiment, but is preferred in design and operation. Like reference numerals are utilized to denote identical components in the two embodiments.

As mentioned above, the link member 43 is pivotally connected at one end to the bracket 42 by a linkage pin 44. The other end of the link member 43 is pivotally connected by a pin 100 to one end of a throttle connector arm 102. The other end of the throttle connector arm 102 is connected to the throttle cable 48 by any conventional means, such as by threading the throttle cable through an aperture (not shown) formed in a hooked end portion 104 of the throttle connector arm 102. A stop plug 106 is attached to the end of the throttle cable 48 to prevent it from being pulled through the aperture formed in the adapter 104.

Between the two ends thereof, the throttle connector arm 102 is pivotally connected in an adjustable manner to the interior panel 32b of the housing 32. Such adjustable pivotal connection is accomplished by forming a first plurality of apertures 108 in the throttle connector arm 102 near the center thereof. A second plurality of apertures 110 are formed in the interior panel 32b of the housing 32. If desired, the interior panel 32b can include a raised area 112 to space the throttle connector arm 102 apart therefrom, and the apertures 110 would extend therethrough. A third plurality of apertures 114 are formed in a second exterior wall 32c of the housing 32. The second exterior wall 32c can include a similar raised portion 116 to space the throttle connector arm 102 apart therefrom. Preferably, the apertures 114 do not extend completely through the second exterior wall 32c. As discussed above, any number of such apertures 108, 110, and 114 can be utilized.

A pin 118 is inserted through a selected one of the apertures 108 formed in the throttle connector arm 102 and also through the corresponding one of the apertures 110 formed in the interior panel 32b of the housing 32 to provide a fulcrum about which the throttle connector arm 102 is free to pivot. The other end of the pin 118 can be maintained in the corresponding aperture 114 formed in the second exterior wall 32c of the housing 32. The second exterior wall 32c is removably attached to the housing 32 such that it can be removed to permit the placement of the pin 118 to be adjusted. After such adjustment is made, the second exterior wall 32c is re-attached to the housing, thereby blocking the pin 118 and preventing it from being removed from the apertures 108, 110, and 114. By retaining the other end of the pin 118 in the corresponding one of the apertures 114, the pin 118 will be effectively prevented from twisting or otherwise being moved as the throttle connector arm 102 is pivoted. The operation of the modified embodiment is substantially identical to that described above.

Most, if not all, modern vehicle speed control units include some sort of lost motion connection between the throttle actuating mechanism of the speed control unit and the throttle. Without lost motion, the throttle servo 20 and related linkage would be forced to move whenever the vehicle operator took control of the throttle (push-through mode or speed control off). Forcing the speed control linkage to move results in greater effort on the part of the vehicle operator and unnecessary wear on the vehicle. The present invention provides a particularly advantageous lost motion connection, since the connection between the throttle connector arm 102 and the throttle cable 48 is enclosed between the interior panel 32b and the second exterior wall 32c of the housing 32. As shown in FIG. 7, the throttle cable 48 can be moved upwardly through the aperture formed in the hooked end portion 104 when the vehicle accelerates under the control of the operator. When the vehicle speed control unit is turned off or when the vehicle is operated at a speed above the desired speed, the vehicle operator does not have to compress the resilient means urging the diaphragm 20a of the throttle servo 20 away from its set position. The slack portion of the throttle cable which is pushed upwardly through the aperture formed in the hooked end portion 104 is effectively prevented from accidentally becoming entwined or otherwise contacted by the other components of the speed control unit or the vehicle engine since it is located inside the housing 32.

It will be appreciated that the vehicle speed control unit of the present invention is quite simple to install on virtually any type of vehicle. This results from the fact that the present invention includes the motor 16 and the vacuum pump 18, thus eliminating the need to provide a connection between the vehicle speed control unit and the engine manifold. Prior art speed control units required such a connection in order to provide a source of vacuum to actuate the throttle servo 20. Aside from being difficult to install, such a connection can adversely affect the performance of the engine because the application of vacuum to the speed control unit appears as a leak in the engine manifold. The present invention solves both of these problems by providing an on-board vacuum pump to actuate the mechanical throttle control components.

In accordance with the patent statutes, the principle and mode of operation of the present invention have been explained and illustrated in its preferred embodiment. However, it must be understood that the present invention can be practiced otherwise that as specifically explained and illustrated without departing from its spirit or scope.

What is claimed is:

1. In a speed control unit for controlling the actual speed of a vehicle at a desired speed, the vehicle including an engine having a throttle movable in two directions respectively to increase and decrease the speed of the vehicle and the speed control unit including means for generating a signal representing the desired speed of the vehicle, means for generating a signal representing the actual speed of the vehicle, and means responsive to said desired speed signal and said actual speed signal for generating a control signal when the actual speed of the vehicle is less than the desired speed, a throttle control assembly installable as a unit in an engine compartment of said vehicle and comprising:
    an electric motor; and
    a vacuum pump operatively connected to said motor to generate a vacuum when said motor is energized so as to move said throttle and increase the actual speed of the vehicle to said desired speed, said vacuum pump including a pump chamber, a rotatably mounted swash plate, a reciprocably mounted plunger including a rod portion having one end in engagement with the swash plate and an enlarged head portion disposed at the other end of the rod portion and within the pump chamber, a flexible pumping diaphragm in the pump chamber operatively associated with the plunger head portion, a spring in the pump chamber biasing said diaphragm and plunger toward said swash plate, a vacuum chamber, a first pair of one-way valves associated with the pump chamber on one side of said diaphragm, and a second pair of one-way valves associated with the pump chamber on the other side of said diaphragm, one valve of each pair permitting one-way flow of air from the pump chamber to atmosphere, and the other valve of each pair permitting one-way flow of air from the vacuum chamber to the pump chamber.

2. A throttle control assembly as claimed in calim 1 further including a throttle servo enclosing a member, said enclosed member being movable in two directions and being operatively connected to said throttle, and responsive to vacuum generated by said vacuum pump.

3. A throttle control assembly as claimed in claim 2 and including a pivotally mounted throttle connector arm having one end connected to the movable member of the throttle servo means and an opposite end connected to said throttle.

4. A throttle control assembly as claimed in claim 3 including a vent valve and a dump valve each operatively associated with said throttle servo means to relieve vacuum therein upon receipt of a respective electrical signal from said control signal generating means.

5. A throttle control assembly as claimed in claim 4 including means for sensing the position of the movable member of the throttle servo means and sending an electrical signal representative of said position to said control signal generating means.

6. In a vehicle speed control unit including means responsive to the generation of vacuum in a vacuum chamber for moving a throttle of the vehicle so as to control the vehicle speed, a means for selectively generating vacuum in the vacuum chamber comprising:
    motor means adapted to be selectively energized;
    swash plate means connected to said motor means for rotation when said motor means is energized;
    plunger means engaged with said swash plate means for reciprocating movement in first and second directions when said swash plate means is rotated;
    diaphragm means disposed in a pumping chamber and connected to said plunger means for reciprocating movement therewith so as to generate a vacuum in the vacuum chamber when said plunger means is reciprocated; and
    first valve means disposed in said pumping chamber for providing fluid communication from said pumping chamber to the atmosphere when said plunger means is moved in a first direction.

7. The invention defined in claim 6 wherein said motor means includes an electric motor having a rotatable output shaft.

8. The invention defined in claim 7 further including gear means connected between said output shaft of said motor means and said swash plate means.

9. The invention defined in claim 6 wherein said plunger means includes a plunger rod connected to a plunger head, said plunger rod engaged with said swash plate means and said plunger head connected to said diaphragm means.

10. The invention defined in claim 6 further including means for urging said plunger means into engagement with said swash plate means.

11. The invention defined in claim 10 wherein said means for urging includes a spring disposed in said pumping chamber in engagement with said diaphragm means.

12. The invention defined in claim 6 further including second valve means disposed in said pumping chamber for providing fluid communication from the vacuum chamber to the pumping chamber when said plunger means is moved in the first direction.

13. The invention defined in claim 12 further including third valve means disposed in said pumping chamber for providing fluid communication from said pumping chamber to the atmosphere when said plunger means is moved in the second direction.

14. The invention defined in claim 13 further including fourth valve means disposed in said pumping chamber for providing fluid communication from the vacuum chamber to the pumping chamber when said plunger means is moved in the second direction.

* * * * *